UNITED STATES PATENT OFFICE.

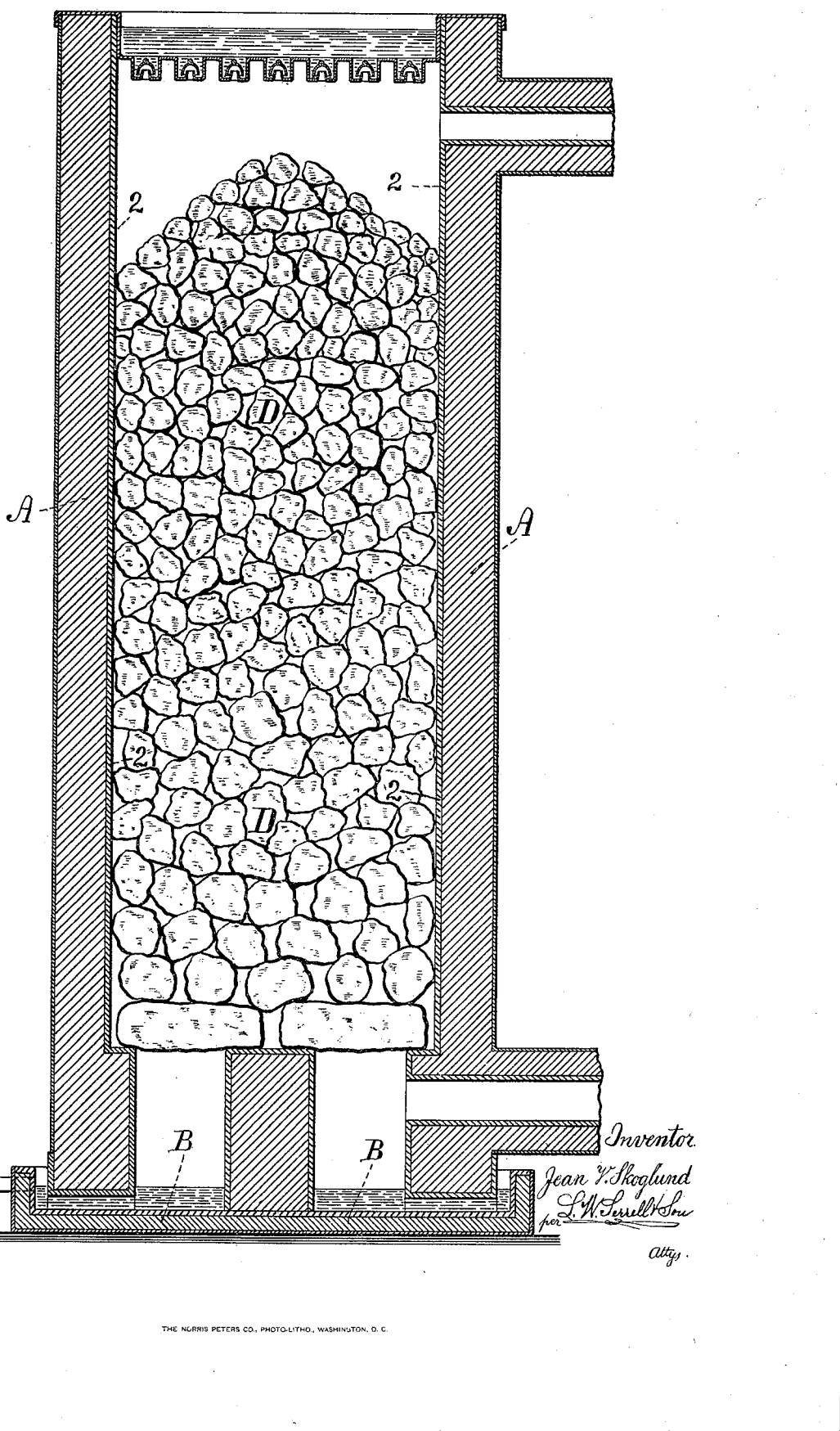

JEAN V. SKOGLUND, OF BAYONNE, NEW JERSEY, ASSIGNOR TO HIMSELF, AND ALBERT WINTER, OF NEW YORK, N. Y.

APPARATUS FOR MAKING ACIDS.

SPECIFICATION forming part of Letters Patent No. 640,037, dated December 26, 1899.

Application filed December 21, 1898. Serial No. 699,944. (No model.)

*To all whom it may concern:*

Be it known that I, JEAN V. SKOGLUND, a subject of the King of Sweden and Norway, residing at Bayonne city, in the county of Bergen and State of New Jersey, have invented an Improvement in Apparatus for Making Acids, of which the following is a specification.

In the manufacture of acids, especially sulfuric acid, there has always been difficulty in obtaining a cheap and reliable material adapted to resist the corrosive action of hot acid in the manufacture or concentration thereof, and the towers that have before been used have required cleaning frequently, repacking, and relining, and the quality of the acid is impaired by the material made use of in the packing and lining.

Towers for the manufacture of sulfuric acid are sometimes known as "Glovers" towers, "Gay Lussac" towers or "concentrating-towers," and the present improvement is available with either of these towers or similar acid-making apparatus.

Quartz has frequently been used for the packing; but the lining has usually been of bricks nominally acid-proof, since it is difficult to cut the pieces of quartz with regularity, and other materials that have been employed are not acid-proof, but are more or less disintegrated by such acid.

The object of the present invention is to make the tower or other apparatus that is exposed to the corrosive action of acids in their manufacture or purification proof against such acids. I find that a perfect acid-resisting plaster is made by a solution of silicate of soda or potash mixed with acid-resisting mineral substances, such as ground quartz, and this mixture after it has been thoroughly dried and treated with an acid—for instance, sulfuric acid—resists both boiling water and hot acid and does not disintegrate. When the mixture has been dried and treated with an acid, most of the alkali is dissolved by the acid, and the residue is a coherent mass having the quality of resisting the action of acid. I find that finely-ground quartz, sea-sand, or gravel, which is almost pure silica, or pieces of broken quartz when mixed with the silicate of soda possess all the properties required, and the same are cheap and easy to work. The proportion of the acid-proof materials to the solution of silicate of soda or potash will vary according to the place where the material is to be employed. For instance, for plastering a vertical surface the solution of silicate of soda should be of greater specific gravity than when used for filling between horizontal layers of bricks. In the latter instance the plaster should be thinner, so as to fill the interstices to better advantage.

In carrying out this invention the tower or other apparatus may be of any usual or desired size, shape, or construction. Where there is a pan at the bottom and a curtain or other inclosure of lead constructed in the usual manner, the bottom of the pan is covered by a stratum of bricks laid in the plaster. The tops of the bricks are covered with a layer of this plaster about one-half an inch thick, and it is advantageous to add to the plaster gravel to make it sufficiently stiff. The lining is laid up in the usual way, with the exception that the bricks are laid up in the aforesaid plaster, and it is often advantageous to dip the bricks into this plaster before laying them up. If there are arches or other devices, they can be laid up as usual, employing the aforesaid plaster, and the entire exposed surface of the lining is to be covered or coated with the aforesaid plaster about one-half an inch thick, more or less. After this has been done a fire is made in the tower itself to dry it as perfectly as possible, and then pieces of quartz or similar material that are acid-proof are packed into the tower to fill the same, and should there be any materials or bodies not absolutely acid-proof they are to be first coated with the aforesaid plaster.

After the tower has been completed, as aforesaid, it is to be flushed with acid, which, combining with the silicate of soda, renders the plaster acid and water proof, and this plaster does not crack off from the lining, especially in view of the fact that the adhesion between the bricks and the coating is intimate and reliable and forms a solid mass.

In the drawing I have represented by a vertical section a sulfuric-acid tower with the coating applied to the same at 2 2. The bricks A, forming the lining, and the bricks B at the bottom can be laid up in this plaster as well as being coated upon their interior surfaces, and the packing of stones, such as quartz, is illustrated at D.

In consequence of this improved plaster the lining can be made much thinner, and in some instances the bricks may be dispensed with and the lining applied directly to the interior of the casing of the tower.

I claim as my invention—

An acid-making apparatus consisting of a tower or chamber with an opening for the admission of the acid-vapors, such tower being made of mason-work coated on the inside with an acid-resisting material and silicate of potash or soda, and treated with an acid to remove from the silica any alkaline material, substantially as specified.

Signed by me this 8th day of December, 1898.

J. V. SKOGLUND.

Witnesses:
GEO. T. PINCKNEY,
S. T. HAVILAND.